(12) United States Patent
Palicki

(10) Patent No.: US 6,598,348 B2
(45) Date of Patent: Jul. 29, 2003

(54) VEHICLE DOOR FRAME AND ATTACHED SEALING PROFILE

(75) Inventor: Dirk Palicki, Hergenweiler (DE)

(73) Assignee: Metzeler Automotive Profile Systems GmbH, Lindau Bodensee (DE)

( * ) Notice: Subject to any disclaimer, the term of this patent is extended or adjusted under 35 U.S.C. 154(b) by 0 days.

(21) Appl. No.: 09/991,062

(22) Filed: Nov. 21, 2001

(65) Prior Publication Data

US 2002/0062596 A1 May 30, 2002

(30) Foreign Application Priority Data

Nov. 24, 2000 (DE) .......................... 100 58 497

(51) Int. Cl.⁷ .............................................. B60J 10/00
(52) U.S. Cl. ..................... 49/479.1; 49/489.1; 49/492.1
(58) Field of Search ........................... 49/489.1, 492.1, 49/479.1, 483.1, 495.1, 475.1

(56) References Cited

U.S. PATENT DOCUMENTS

| | | | | |
|---|---|---|---|---|
| 1,712,472 A | * | 5/1929 | Campbell | 220/DIG. 3 |
| 2,919,478 A | * | 1/1960 | Sehn et al. | 49/476.1 |
| 4,864,774 A | * | 9/1989 | Onishi et al. | 49/440 |
| 5,085,005 A | * | 2/1992 | Yasukawa et al. | 49/377 |
| 5,085,024 A | * | 2/1992 | Emmons et al. | 296/201 |
| 5,219,382 A | * | 6/1993 | Backes | 49/440 |
| 5,267,415 A | * | 12/1993 | Vaughan | 49/377 |
| 5,433,038 A | * | 7/1995 | Dupuy | 49/377 |
| 5,519,968 A | * | 5/1996 | Dupuy | 49/377 |
| 5,561,003 A | * | 10/1996 | Nowosiadly | 428/99 |
| 5,799,442 A | * | 9/1998 | Takahashi et al. | 49/377 |

FOREIGN PATENT DOCUMENTS

| | | |
|---|---|---|
| DE | 925 153 D1 | 3/1955 |
| DE | 298 02 987 U1 | 5/1998 |
| EP | 0 715 981 A1 | 6/1996 |

* cited by examiner

Primary Examiner—Gregory J. Strimbu
(74) Attorney, Agent, or Firm—Stephen B. Salai, Esq.; Roger Aceto, Esq.; Harter, Secrest & Emery LLP

(57) ABSTRACT

A sealing profile for securing to a motor vehicle component, more particularly to a frame of a door in the region of the C-pillar includes an insert provided for preventing prohibitive deformations of the sealing profile. The insert has at least one elastically deformable detent for securing to the motor vehicle component and at least one supporting plate for stiffening the sealing profile, the supporting plate being formed integral with the detent in one piece.

6 Claims, 3 Drawing Sheets

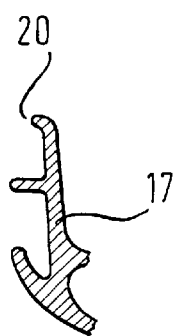
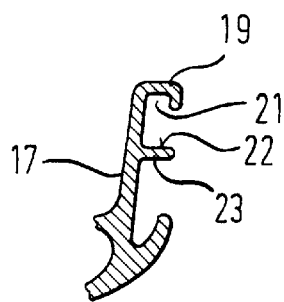
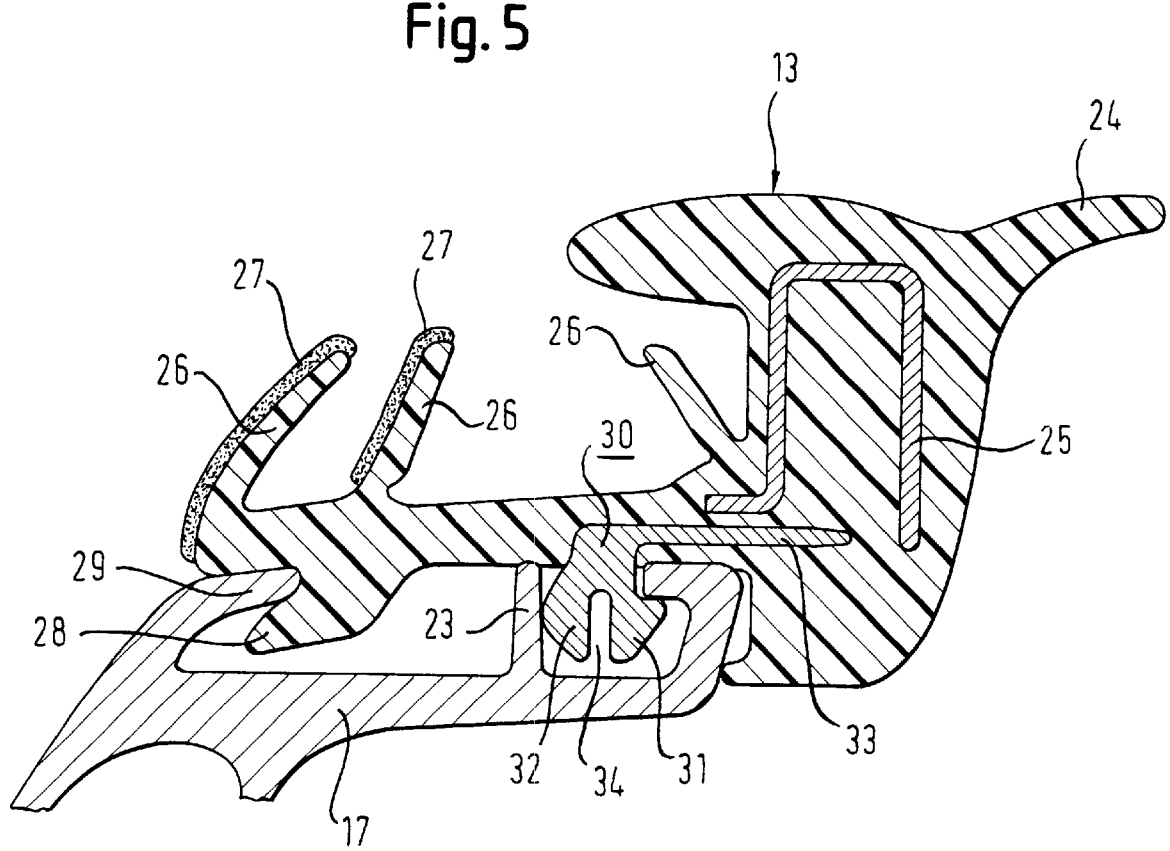

US 6,598,348 B2

VEHICLE DOOR FRAME AND ATTACHED SEALING PROFILE

FIELD OF THE INVENTION

The present invention relates to a sealing profile for securing to a motor vehicle component, more particularly to a frame of a door.

BACKGROUND OF THE INVENTION

Extruded channel sections of light alloy, more particularly of aluminum, are used in producing the frame on a series of motor vehicles. These channel sections are bent to adapt to the roof contour of the vehicle. Due to their material properties the channel sections cannot be totally adapted to the roof contour, resulting in a space being created between the upper edge of the frame and the roof. This interspace needs to be covered by a sealing profile. The interspace occurs more particularly in the region of the C-pillar of a motor vehicle.

A variety of sealing profiles (weatherseals) is known for covering the interspace. The disadvantage of these sealing profiles is the complicated fastening arrangement involving additional elements, for example, screws. Furthermore, the sealing profile is made of an elastomeric material and is thus flexible and deformable. When the door is open, it often protrudes beyond the frame and is often used in closing the door. Due to the low stiffness of the sealing profile there is a risk of it being prohibitively deformed and thus damaged. Apart from this, the sealing profile may become detached from the frame.

The objective of the present invention is thus to provide a sealing profile which can be simply secured to a motor vehicle component, more particularly to a door frame, whilst featuring enhanced stiffness.

SUMMARY OF THE INVENTION

In accordance with the invention, this objective is achieved for a sealing profile of the aforementioned kind in that the sealing profile comprises an insert provided with at least one elastically deformable detent for securing to the motor vehicle component and with at least one supporting plate for stiffening the sealing profile. The supporting plate is materially connected to the detent in one piece.

The insert including the at least one detent achieves reliably safe fastening of the sealing profile to the motor vehicle component without the use of additional fasteners. The supporting plate is configured as part of the insert and results in the stiffness of the sealing profile being enhanced. Forces engaging the sealing profile away from the motor vehicle component are transmitted via the insert directly to the motor vehicle component. Deformation of the sealing profile is substantially reduced.

Advantageous aspects and further embodiments of the invention are set forth in the dependent claims.

Advantageously, the detent has a substantially triangular section. Thus, the detent comprises a slanting surface area which, on fitting, contacts protuberance of the motor vehicle component which elastically deforms the detent. After having clasped the protuberance, the detent relaxes to securely locate the sealing profile.

In one advantageous aspect the detent comprises a supporting part spaced away from the detent by an interspace. The supporting part prevents the detent from slipping out of the undercut. Due to the interspace, the elastic deformation of the detent is not obstructed. For each detent a separate supporting part may be provided. As an alternative, a full-length supporting part may be used. The supporting part may be additionally likewise configured as a detent in clasping a protuberance of the motor vehicle component in the fitted condition.

In accordance with another advantageous aspect, the detent and/or the supporting part protrude from the sealing profile in thus avoiding damage to the sealing profile on fitting. At the same time, a direct contact between the insert and the motor vehicle component is provided so that forces engaging the sealing profile are directly transmitted to the motor vehicle component.

Advantageously, the supporting plate is arranged substantially parallel to a closure part to be sealed off by the sealing profile. In this case the supporting plate is located substantially in the plane of the closure part and the door so that the desired position of the sealing profile is reliably maintained.

In addition, the sealing profile may comprise an appendage or attachment for clasping a rib of the motor vehicle component. This appendage prevents the end of the sealing profile facing the closure part from being lifted off to further improve the secure location of the profile.

In another advantageous embodiment several detents are provided spaced away from each other. The individual detents can then be deformed by little effort so that the sealing profile can be fitted with little force. Advantageously, the detents are located on a curve conforming to the bend of the motor vehicle component.

The insert is arranged to advantage in the region of the C-pillar of a motor vehicle. In this region the sealing profile protrudes comparatively far beyond the motor vehicle component.

The invention also relates to a motor vehicle component, more particularly a frame of a door of a motor vehicle, to which a sealing profile as described above is secured. The motor vehicle component in accordance with the invention is provided with a number of protuberances and recesses, the protuberances forming undercuts for securing the detents of the sealing profile. Provided between the detents are recesses for receiving the insert in thus achieving a low profile and accordingly a streamlined outer contour.

Advantageously, the motor vehicle component is provided with a protuberance for providing a contact surface area for a supporting part of the sealing profile. This contact surface area results in the insert being supported to further improve locating the sealing profile and transmitting the force into the motor vehicle component. In this arrangement, the contact surface area may be configured flat or form an undercut for locating a supporting part configured as a detent.

DESCRIPTION OF THE FIGURES

FIG. 3 is a section taken along the line III—III in FIG. 2;
FIG. 4 is a section taken along the line IV—IV in FIG. 2;
FIG. 5 is a section taken along the line V—V in FIG. 2 after the sealing profile has been fitted.

DETAILED DESCRIPTION OF THE INVENTION

Figure 1:
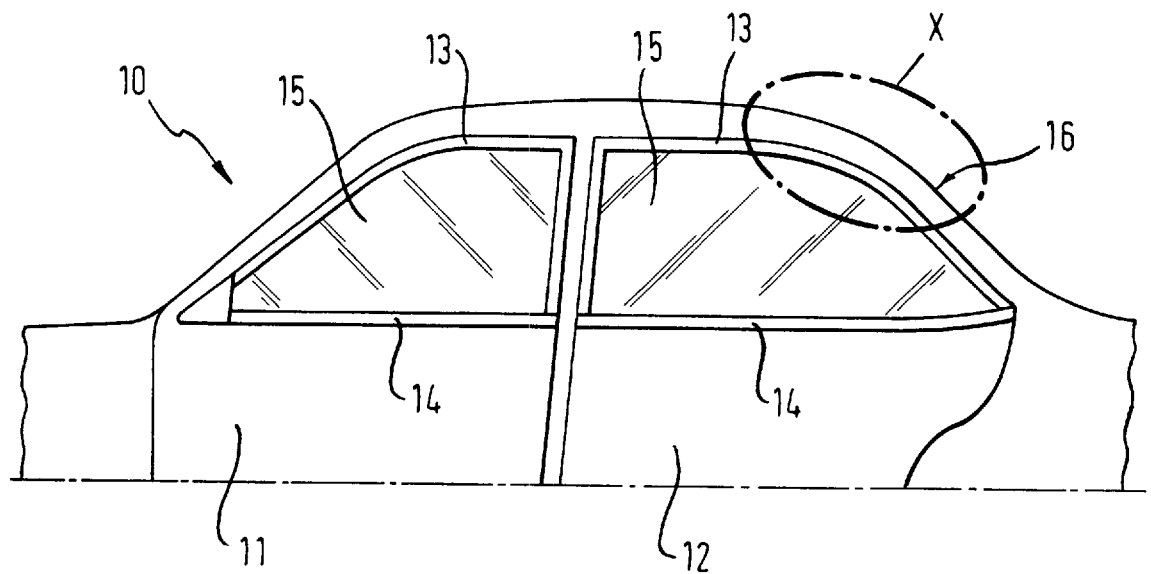
FIG. 1 is a diagrammatic view of a motor vehicle.

Referring now to FIG. 1, there is illustrated diagrammatically a side view of a motor vehicle 10 including a front door 11 and a rear door 12. Bath doors 11, 12 are provided with a seating profile 13 in the region of a frame 17 (see FIG. 2) and a channel seal 14 for guiding and sealing a powered window pane 15.

Figure 2:
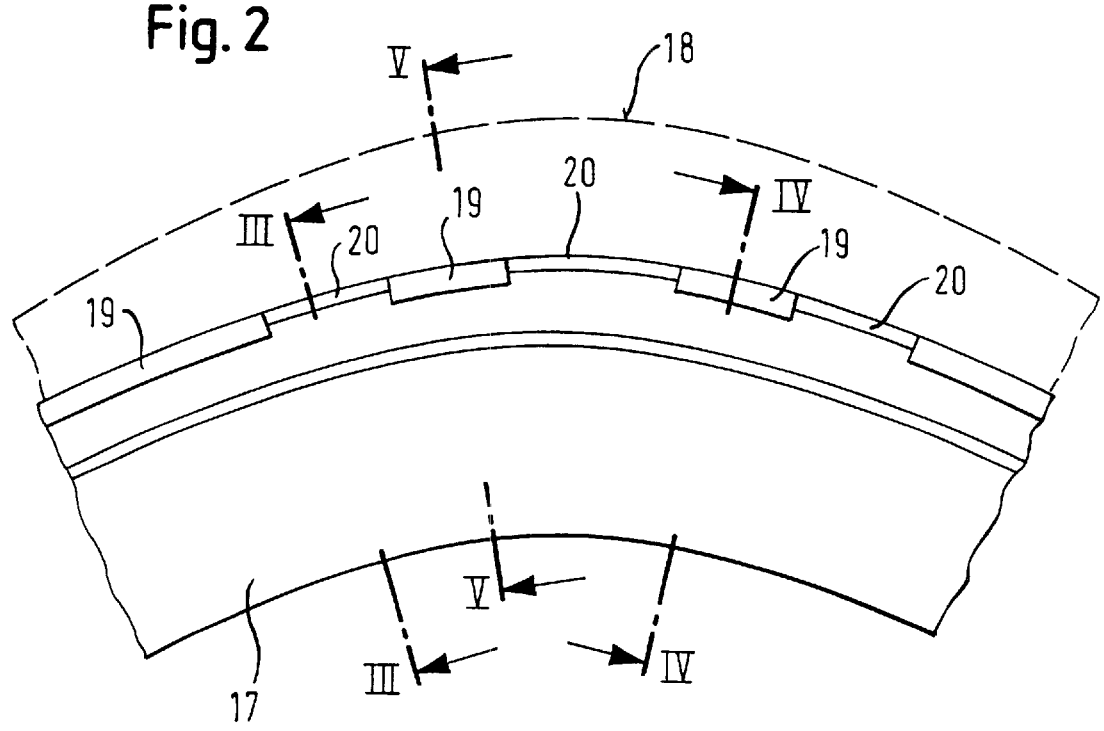
FIG. 2 is a magnified detail X as shown in FIG. 1.

Referring now to FIG. 2, there is illustrated a magnified detail X as shown in FIG. 1 in the region of the C-pillar 16 of the motor vehicle 10. Illustrated diagrammatically is a section of the frame 17 of door 12. The outer contour of the sealing profile 13 is indicated by the broken line 18. In the region of the C-pillar 16 as shown, the sealing profile 13 clearly protrudes beyond the frame 17. The reason for this is that the frame 17 cannot be adapted to the roof contour to its full extent.

Referring now to FIGS. 3 to 5, there is illustrated a section taken along the line III—III, IV—IV and V—V respectively as shown in FIG. 2 in detailing the configuration of the frame 17 and the sealing profile 13.

For guiding and sealing the window pane 15, the sealing profile 13 is provided with a plurality of lips 26 provided partly with a friction-reducing flock 27. A lip 24 serves to seal the sealing profile from the roof. The end of the sealing profile 13 facing the windowpane 15 is provided with an attachment 28 clasping a protuberance 29 of the frame 17. It is this connection that reliably locates the sealing profile 13 in preventing it from being lifting off undesirably.

The sealing profile 13 also comprises an insert 30 provided with several detents 31 for securing to frame 17. As shown in FIG. 4, the frame 17 is provided with protuberances 19 forming undercuts 21 for the detents 31. Between the protuberances 19 the frame 17 is provided with recesses 20 (see FIG. 2).

To locate the sealing profile 13, the insert 30 is furthermore provided with supporting parts 32. These supporting parts 32 are spaced away from the detents 31 via an interspace 34 so as not to obstruct deformation of the detents 31 on fitting the sealing profile 13. To support the supporting parts 32, the frame 17 is provided with a further protuberance 23 forming a flat contact surface area 22 for the supporting parts 32.

The detents 31 have a substantially triangular cross-section and comprise a slanting contact surface area for contacting the protuberances 19, resulting in the detents 31 being elastically deformed in the direction of the supporting parts 32 on being fitted and latching in place in the undercuts 21 after having negotiated the protuberances 19. The supporting parts 32 slide along the contact surface area 22 in preventing the detents 31 from emerging from the undercuts 21. As shown in FIG. 5 the supporting parts 32 result in securement in the horizontal direction and the detents 31 in securement in the vertical direction. Both the detents 31 and the supporting parts 32 protrude from the sealing profile 13 in directly contacting the frame 17.

The insert 30 also comprises a supporting plate 33 that is disposed within the sealing profile 13 and which is connected to the detents 31 and supporting parts 32 substantially in one piece. The detents and supporting parts are integral the supporting plate adjacent an end of the plate. Starting from the frame 17, the supporting plate 33 extends substantially parallel to the windowpane 15 in the sealing profile 13 for stiffening it and the detents 31 and supporting parts 32 extend generally normal to the plane of the supporting plate and out of the sealing profile 13 for connection to the frame 17. In addition, a further reinforcement insert 25 may be provided for locating the sealing profile 13 on a flange (not shown) of the frame 17. Forces acting on the sealing profile 13 are absorbed by the supporting plate 33 and transmitted via the detents 31 and supporting parts 32 to the sealing profile 13 in thus significantly reducing deformations of the sealing profile 13.

Figure 6:
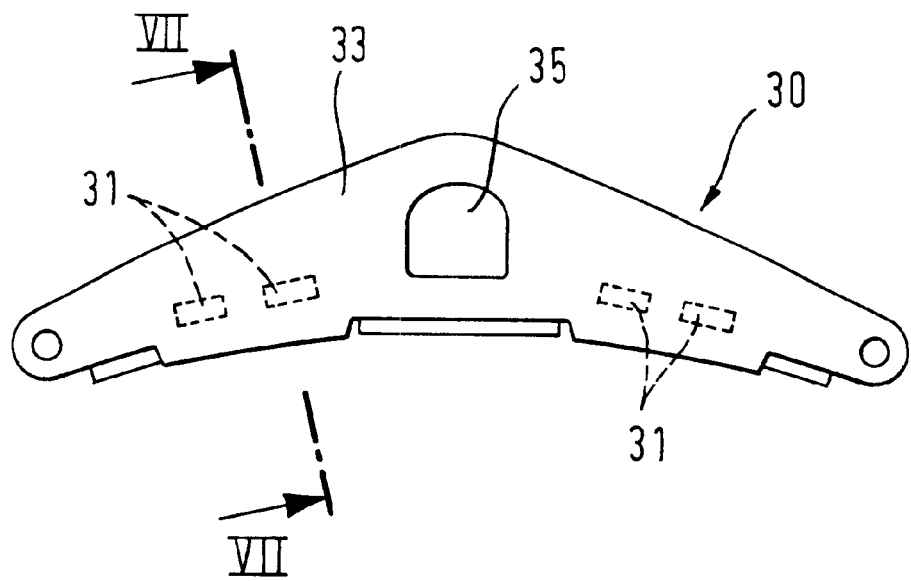
FIG. 6 is plan view of the insert.
Figure 7:
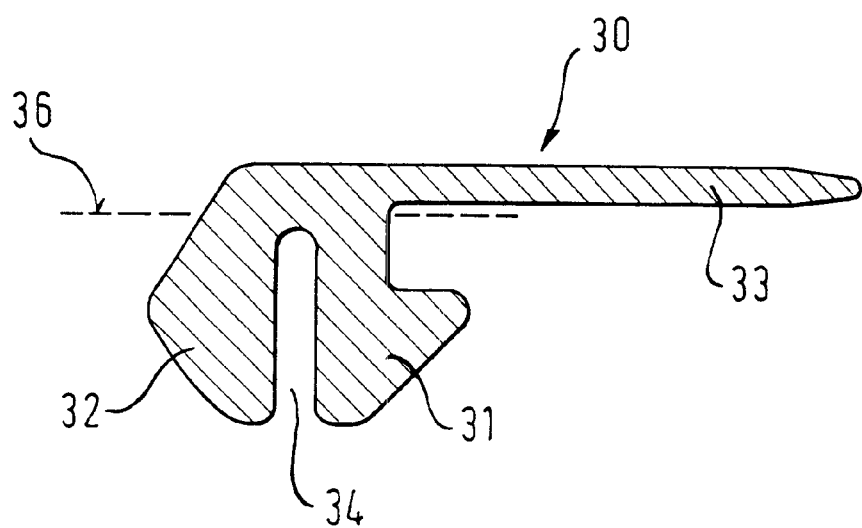
FIG. 7 is a section taken along the line VII—VII in FIG. 6.

Referring now to FIGS. 6 and 7, there is illustrated the insert 30 in a plan view and in a magnified detail cross-section. The supporting plate 33 is substantially V-shaped and adapted to the interspace between the frame 17 and the roof. It is provided with a hole or recess 35 to reduce the weight and to improve locating in the sealing profile 13. The detents 31 are arranged substantially on a circle adapted to the contour of the frame 17, the supporting parts 32 too being likewise correspondingly arranged. For a better explanation, there is illustrated diagrammatically in FIG. 7 the lower edge of the sealing profile 13 as a broken line 36. The detents 31 and the supporting parts 32 protrude from the sealing profile 13.

Due to the insert 30 including the detents 31 and supporting parts 32 the sealing profile 13 in accordance with the invention is quickly and easily fitted to the frame 17 without requiring additional fasteners. The supporting plate 33 of the insert 30 results in the sealing profile 13 being stiffened in thus reliably preventing prohibitive deformation and damage.

What is claimed is:

1. A combination motor vehicle door frame and attached sealing profile comprising:
   a) said door frame having a plurality of first protuberances spaced one from another to provide recesses therebetween, each of the first protuberances forming an undercut and said door frame further having a second protuberance forming a contact surface facing towards said undercut;
   b) said sealing profile having an insert comprising
      i) at least one supporting plate disposed within said sealing profile stiffening said sealing profile,
      ii) at least one elastically deformable detent integral said supporting plate and protruding from said sealing profile, and
      iii) at least one supporting part integral said supporting plate and protruding from said sealing profile, said supporting part being spaced away from said detent by an interspace allowing an unobstructed deformation of said detent;
   c) said detent engaging a respective one of said undercuts to secure said sealing profile to said frame; and
   d) said supporting part sliding along said contact surface during the engaging of said detent to said respective one of said undercuts and bearing against said contact surface to prevent the disengagement of said detent from said respective one of said undercuts.

2. A combination as set forth in claim 1 wherein said detent has a substantially triangular cross section.

3. A combination as set forth in claim 1 wherein said door frame includes a rib and said sealing profile further comprises an attachment arranged at one end of said sealing profile and clasping said rib.

4. A combination as set forth in claim 1 wherein said door frame forms a C-pillar and said detent engages said respective one of said undercuts to secure said sealing profile to said door frame adjacent said C-pillar.

5. A combination as set forth in claim 4 wherein said sealing profile seals a window pane in the door frame and said supporting plate is disposed in a plane substantially parallel to said window pane.

6. A combination as set forth in claim 4 wherein the engagement of said detent to said respective one of said undercuts provides securement of said sealing profile to said door frame in a first direction and the bearing of said supporting part against said contact surface provides securement of said sealing profile relative to said door frame in a second direction perpendicular to said first direction.

* * * * *

UNITED STATES PATENT AND TRADEMARK OFFICE
CERTIFICATE OF CORRECTION

PATENT NO.    : 6,598,348 B2
DATED         : July 29, 2003
INVENTOR(S)   : Palicki, Dirk It is certified that error appears in the above-identified patent and that said Letters Patent is hereby corrected as shown below:

Column 1,
Line 7, "scaling" should read -- sealing --.
Line 39, "scaling" should read -- sealing --.

Column 2,
Line 64, "Bath" should read -- Both --.

Signed and Sealed this

Seventh Day of October, 2003

JAMES E. ROGAN
*Director of the United States Patent and Trademark Office*